Patented Feb. 24, 1925.

1,527,163

UNITED STATES PATENT OFFICE.

GUSTAV ADOLPH AMPT, OF MELBOURNE, VICTORIA, AUSTRALIA, ASSIGNOR OF ONE-HALF TO SAMUEL CHARLES LANSDOWN, OF NORTH FITZROY, VICTORIA, AUSTRALIA.

LEATHER SUBSTITUTE AND LIKE COMPOSITION.

No Drawing. Application filed June 6, 1922. Serial No. 566,413.

*To all whom it may concern:*

Be it known that GUSTAV ADOLPH AMPT, subject of the King of Great Britain, residing at Melbourne, Victoria, Australia, has invented certain new and useful Improvements in Leather Substitutes and like Compositions, of which the following is a specification.

This invention relates to improvements in the compounding and utilization of cork, scrap leather, or other fibrous materials for the manufacture of leather substitute and like compositions.

It has been proposed to manufacture water-proof shanks for insertion between the inner and outer soles of boots and shoes by combining a fibrous pulp with a water-proof cement such as rubber or glue rendered water-proof by treatment with tannin or its equivalent. It has also been proposed to render cloth, paper, and other fibrous materials water-proof and to form a surfacing compound for enameled rubber cloth of boiled linseed oil and plastic rubber. It has further been proposed to form a very flexible or supple water-proof coating of albumen or gluten and a solution of india rubber or a substitute.

While such products have been devised with a view to flexibility, the object of my invention is firstly to produce articles such as the heels and soles of boots and shoes, cricket balls and other articles for which leather compositions and the like are at present employed and which require to be substantially rigid while retaining true elasticity, and great adhesion, and secondly to produce a composition which, while being sufficiently resistant and tough for many commercial purposes, can be made largely from waste materials.

These objects of invention are attained by using the waste materials specified in a comparatively coarse state, as for example, scrap leather shredded, or cork ground but not pulverized, or fibrous materials teased, as the inert body material, to be mixed with a binding material as a hot plastic mass, which is then moulded under considerable pressure, such pressure being sufficiently high to force the binding medium into the pores and/or interstices of the indifferent body material, whereby the integral composition when set exhibits a considerable tensile and shear strength as well as compression strength, resembling in these regards the attributes characterizing leather, this substitute being also highly rigid, elastic and very cohesive while non-brittle and homogenous.

These objects are accomplished in the following manner:—

The binding material consists essentially of a mixture, in suitable proportions, of a solution of rubber, or rubberlike substance such as factis or vulcanized oils, in boiled linseed oil, together with a suitable adhesive.

The binding material is, while hot, incorporated with shredded leather, ground cork or teased fibre, with or without previous treatment, in such proportions that the mixture forms a plastic mass, which can be moulded while hot into the desired shape, under suitable pressure such as 1–4 tons to the sq. inch.

In the preferred form of the invention a solution of glue in water is used as the adhesive hereinbefore mentioned, but other adhesives could be utilized for lower grade products.

Under normal conditions a small percentage of carbolic acid, or other known suitable disinfectant or preservative, is used; but deterioration of the product may also be reduced by adopting more sterile conditions of manufacture and protecting the finished article by a relatively impervious coating such as that produced by the treatment set out in the following paragraph.

This material, while sufficiently water-resistant for most purposes, may be further improved in this direction by treatment with formalin after moulding.

While the composition of the mixture and the proportions of the various ingredients may be varied within the scope of the claims according to the conditions and the purpose in view, I have found the following method and proportions suitable for many applications, such as boot heels:—

Four (4) parts of hot glue solution, containing thirty-five (35) per cent of dry glue, are mixed with one (1) part of boiled linseed oil containing ten (10) per cent of pure rubber and two and one half (2½) per cent of commercial carbolic acid.

About five (5) or six (6) parts of shredded leather are placed in a steam heated mixing machine, and the hot binding material is added and thoroughly incorporated.

While the body material in the specific example given is shredded leather, the term body material must be understood to include both fibre and ground cork which are used where a lighter product is required in substitution for leather, either wholly or in part.

The term rubber is used in the claims to include rubber-like substances as hereinbefore specified.

I claim:

1. A composition of matter adapted to be molded under pressure while hot into substantially rigid leather-like articles, and consisting of from five to six parts of a disintegrated body material; approximately four parts of a 35 per cent solution of glue in water; and one part of a mixture of boiled linseed oil containing ten per cent of pure rubber in solution therein.

2. A composition of matter adapted to be molded under pressure while hot into substantially rigid leather-like articles, and consisting of from five to six parts of fibrous disintegrated body material; approximately four parts of a 35 per cent solution of glue in water; and one part of a mixture of boiled linseed oil containing ten per cent of pure rubber in solution therein, and a minor percentage of a preservative.

In testimony whereof he affixes his signature.

GUSTAV ADOLPH AMPT.

Witnesses:
H. WHEELER BROWN,
C. V. DAVIES.